United States Patent
S. et al.

(10) Patent No.: US 12,450,551 B2
(45) Date of Patent: Oct. 21, 2025

(54) INTERNET OF THINGS FLEET MANAGEMENT WITH STOP ARRIVAL AND DEPARTURE FILTERING

(71) Applicant: Oracle International Corporation, Redwood Shores, CA (US)

(72) Inventors: Bharath T. S., Karnataka (IN); Rahul Paul, Bangalore Karnataka (IN); Sourath Roy, Karnataka (IN); Arvind Srinivasan, Pondicherry (IN)

(73) Assignee: Oracle International Corporation, Redwood Shores, CA (US)

( * ) Notice: Subject to any disclaimer, the term of this patent is extended or adjusted under 35 U.S.C. 154(b) by 222 days.

(21) Appl. No.: 17/994,452

(22) Filed: Nov. 28, 2022

(65) Prior Publication Data

US 2024/0177102 A1 May 30, 2024

(51) Int. Cl.
| | |
|---|---|
| *G06Q 10/0833* | (2023.01) |
| *G01C 21/34* | (2006.01) |
| *G08G 1/00* | (2006.01) |

(52) U.S. Cl.
CPC ....... *G06Q 10/0833* (2013.01); *G01C 21/343* (2013.01); *G08G 1/207* (2013.01)

(58) Field of Classification Search
CPC ... G06Q 10/0833; G01C 21/343; G08G 1/207
See application file for complete search history.

(56) References Cited

U.S. PATENT DOCUMENTS

| | | |
|---|---|---|
| 7,755,541 B2 | 7/2010 | Wisherd et al. |
| 10,382,294 B2 | 8/2019 | Bali et al. |
| (Continued) | | |

FOREIGN PATENT DOCUMENTS

| | | |
|---|---|---|
| CN | 104866999 A | 8/2015 |
| CN | 107622364 A | 1/2018 |
| WO | 2019075138 A1 | 4/2019 |

OTHER PUBLICATIONS

Unknown, "How it Works", SenseAware, https://www.senseaware.com, last downloaded on Oct. 30, 2020.

(Continued)

*Primary Examiner* — Anne Marie Antonucci
*Assistant Examiner* — Patrick M Brady
(74) *Attorney, Agent, or Firm* — Potomac Law Group, PLLC

(57) ABSTRACT

Embodiments detect stops by an entity on a pre-planned trip including a plurality of stops and a planned sequence of stops, each stop including a geofence boundary. For each stop, embodiments add an arrival transition region extending inward from the geofence boundary. Embodiments receive a first geo-location message indicating a first location and corresponding to a first time for the entity and determine whether the first location falls within a first arrival transition region corresponding to a first stop having a first geofence boundary. When the first location falls within the first arrival transition region, embodiments wait for a predefined transitional time period. During the predefined transitional time period, when a second geo-location message is received indicating a second location inside the first geofence boundary and outside the first arrival transition region, the first time is determined to be an arrival time for the first stop.

20 Claims, 11 Drawing Sheets

(56) References Cited

U.S. PATENT DOCUMENTS

| | | | |
|---|---|---|---|
| 10,421,437 | B1 | 9/2019 | Koskan |
| 10,863,302 | B2 | 12/2020 | Gonzalez et al. |
| 10,957,204 | B1 | 3/2021 | Kumar et al. |
| 11,830,366 | B2 | 11/2023 | Ren et al. |
| 2004/0243664 | A1 | 12/2004 | Horstemeyer |
| 2010/0007500 | A1 | 1/2010 | Mestres et al. |
| 2010/0090852 | A1* | 4/2010 | Eitan ............... G08B 21/18 340/686.1 |
| 2011/0050397 | A1 | 3/2011 | Cova |
| 2013/0147617 | A1 | 6/2013 | Boling et al. |
| 2013/0225282 | A1 | 8/2013 | Williams et al. |
| 2016/0232483 | A1 | 8/2016 | London et al. |
| 2016/0379165 | A1 | 12/2016 | Moakley |
| 2017/0127249 | A1 | 5/2017 | Li et al. |
| 2018/0081374 | A1 | 3/2018 | Nimchuk et al. |
| 2018/0158020 | A1 | 6/2018 | Khasis |
| 2018/0288566 | A1* | 10/2018 | Lu ..................... H04W 4/022 |
| 2020/0064865 | A1 | 2/2020 | Lei et al. |
| 2021/0293555 | A1* | 9/2021 | Roherty ............ G01C 21/3415 |
| 2021/0302979 | A1 | 9/2021 | McAlpine et al. |
| 2021/0326744 | A1* | 10/2021 | Israel ................. G06N 5/02 |
| 2022/0046381 | A1 | 2/2022 | Ong et al. |
| 2022/0132274 | A1* | 4/2022 | S. ...................... H04W 84/18 |
| 2023/0147126 | A1 | 5/2023 | Iwamoto et al. |
| 2023/0186230 | A1 | 6/2023 | Paul et al. |
| 2023/0188941 | A1 | 6/2023 | Palop et al. |
| 2023/0336940 | A1 | 10/2023 | Yim et al. |
| 2024/0166076 | A1* | 5/2024 | Rosenblatt ............ B60L 53/305 |

OTHER PUBLICATIONS

Unknown, "Managed Solution for High-Value Asset and fleet Tracking", https://www.sierrawireless.com/products-and-solutions/sims-connectivity-and-cloud-services/managed-iot-solutions/asset-tracking/ 1/, last downloaded on Oct. 30, 2020.

Unknown, "SenseAware is FedEx's IoT response to supply chain optimization", htpps://www.rcrwireless.com/20160929/big-data-anlytics/fedex-iot-tag31, last downloaded on Oct. 30, 2020.

Unknown, "What is SenseAware?", www.senseaware.com, last downloaded on Oct. 30, 2020.

Unknown, Domo IoT Asset Tracking, https://webcache.googleusercontent.com/search?q=cache:A9f7PEUpR_gJ: https://aws.amazon.com/iot/solutions/DomoVerizon/+&cd=1&hl=en&ct=cInk&gl=US, last downloaded on Oct. 30, 2020.

Reclus et al., "Geofencing for Fleet and Freight Management", IIEE Xplore, pp. 353-354, 2009.

* cited by examiner

INTERNET OF THINGS FLEET MANAGEMENT WITH STOP ARRIVAL AND DEPARTURE FILTERING

FIELD

One embodiment is directed generally to a computer system, and in particular to fleet monitoring using a computer system.

BACKGROUND INFORMATION

Large quantities of cargo are transported daily across the continental US and in most other industrial countries using transportation carriers. The use of tractor-trailers as cargo transport vehicles provided by the trucking industry accounts for a significant portion of the vehicles utilized to transport cargo, typically in the form of a "fleet" of trucks. In the trucking industry, cargo is arranged to be transported from an origination point to a destination point via a particular tractor-trailer, driven by an operator/driver.

Remotely monitoring all items associated with a trip is necessary to track inventories and progress in the transport. Specifically, there is a need for real-time end-to-end transportation visibility and insights into business entities, such as vehicle location, condition of containers, status of in-transit inventory, cargo condition, operational costs, vehicle use, and driving behavior.

SUMMARY

Embodiments detect stops by an entity on a pre-planned trip including a plurality of stops and a planned sequence of stops, each stop including a geofence boundary. For each stop, embodiments add an arrival transition region extending inward from the geofence boundary. Embodiments receive a first geo-location message indicating a first location and corresponding to a first time for the entity and determine whether the first location falls within a first arrival transition region corresponding to a first stop having a first geofence boundary. When the first location falls within the first arrival transition region, embodiments wait for a predefined transitional time period. During the predefined transitional time period, when a second geo-location message is received indicating a second location inside the first geofence boundary and outside the first arrival transition region, the first time is determined to be an arrival time for the first stop. After the transitional time period, when no geo-location messages have been received during the transitional time period that fall outside of the first geofence boundary, the first time is determined to be the arrival time for the first stop. After the transitional time period, when one or more geo-location messages have been received during the transitional time period indicating a third location that falls outside of the first geofence boundary, the first time is determined to not be the arrival time for the first stop.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Figure 1:
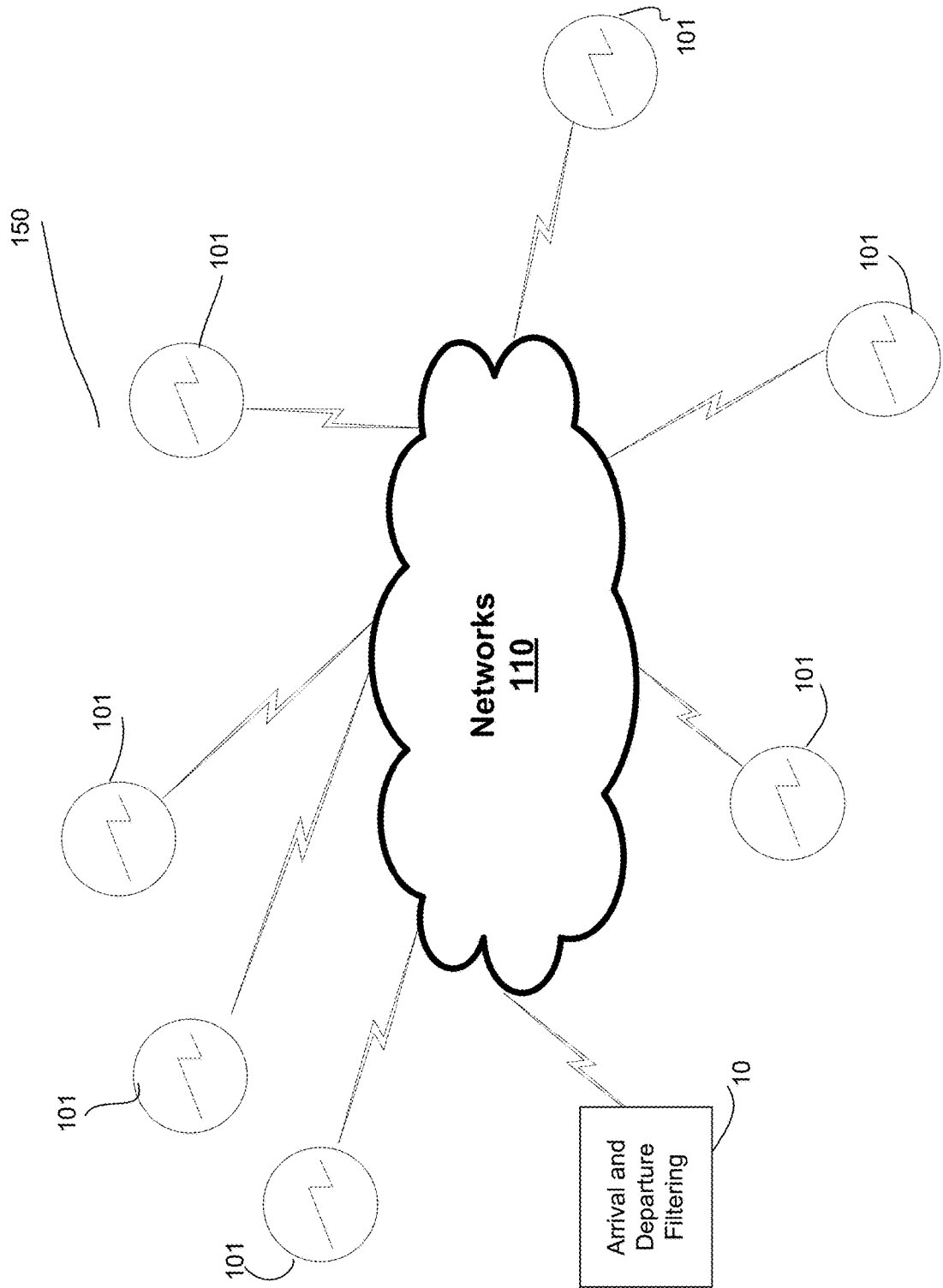
FIG. 1 is an overview diagram of elements of a fleet management arrival/departure detection filtering network/system that can implement embodiments of the invention.

One embodiment is a fleet management system that automatically distinguishes, for planned stops on a trip, between false arrival or departure events from true arrival or departure events using a transition region that serves as a location-based filter and a waiting time duration window that serves as a time-based filter.

A system, such as the "Fleet Monitoring Cloud Service" from Oracle Corp., for creating and monitoring trips (i.e., "fleet management"), will constantly monitor the location information being sent by Global Positioning System ("GPS") or Internet of Things ("IoT") based sensors attached to the vehicle or by the GPS sensors attached to the inventories of that trip.

The trip will have a set of planned stops. The locations for these stops will be set as part of a trip's planning. These stop locations will have geo-coordinates to determine the exact location. The vehicle will arrive and stop at these planned stops to carry out the activities as per the plan, such as dropping off or picking up inventory items. After completing the planned activities at the stop locations, the vehicle will depart from the stop locations.

In general, known fleet management systems monitor the current position of a trip by attaching GPS/IoT sensors to the vehicle carrying out the trip or inventory items (e.g., containers, racks, packages) which are part of the trip. These sensors will send geo-locations to the server (i.e., a central processing unit), and the server will receive and process this information, at a standard time interval (e.g., every 5 minutes).

For example, consider that a vehicle has a GPS sensor attached to itself, and it is periodically sending the current geo-coordinates to the server. When the vehicle reaches a stop, under ideal circumstances, the distance between the vehicle's recorded geo-coordinates and the stop's geo-coordinates would be zero. However, in practical scenarios the distance from the stop geo-location may not necessarily be zero. The vehicle can be stopped at a certain distance from the stop's geo-coordinates, such as if the stop's geo-coordinates are at the entrance of a building, then the vehicle could be stopped at a parking space within the building or somewhere nearby the entrance, or outside the building premises, etc. Therefore, if a tracking/monitoring server is marking the arrival only when the distance between the vehicle's coordinates and the stop's coordinates is zero, then the server will miss the arrival altogether.

Even if the vehicle reaches the exact geo-coordinate of the stop, the GPS sensors attached to the vehicle record and send the geo-coordinates at certain intervals. This means that the sensor may not record the geo-coordinate when the vehicle was at or near the stop's coordinate, but may record the vehicle's coordinate sometime before or after the vehicle has crossed the stop's coordinate. In contrast, embodiments of the invention account for these discrepancies.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is an overview diagram of elements of a fleet management arrival/departure detection filtering network/system 150 that can implement embodiments of the invention. Network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101. For example, for a fleet of "trucks" that are being monitored, each portion of the truck may include a sensor (e.g., the actual truck body and the one or more trailers that are being pulled by the truck, and each item that is loaded into each of the trailers).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. Each of sensors 101 communicate, wirelessly or wired, through one or more networks 110. Networks 110 include the Internet, but may also include private on-premise networks that ultimately interface with the Internet as well as any other type of network that allows sensors 101 to communicate.

A fleet management arrival and departure filtering server 10 is coupled to networks 110 to send and receive data from sensors 101. Fleet management arrival and departure filtering 10 provides filtering to distinguish between false arrivals/departures and true arrivals/departures disclosed herein. In general, fleet management arrival and departure filtering 10 monitors data acquired by each of sensors 101 for purposes of automatically distinguishing between false arrivals/departures and true arrivals/departures during a trip.

Figure 2:
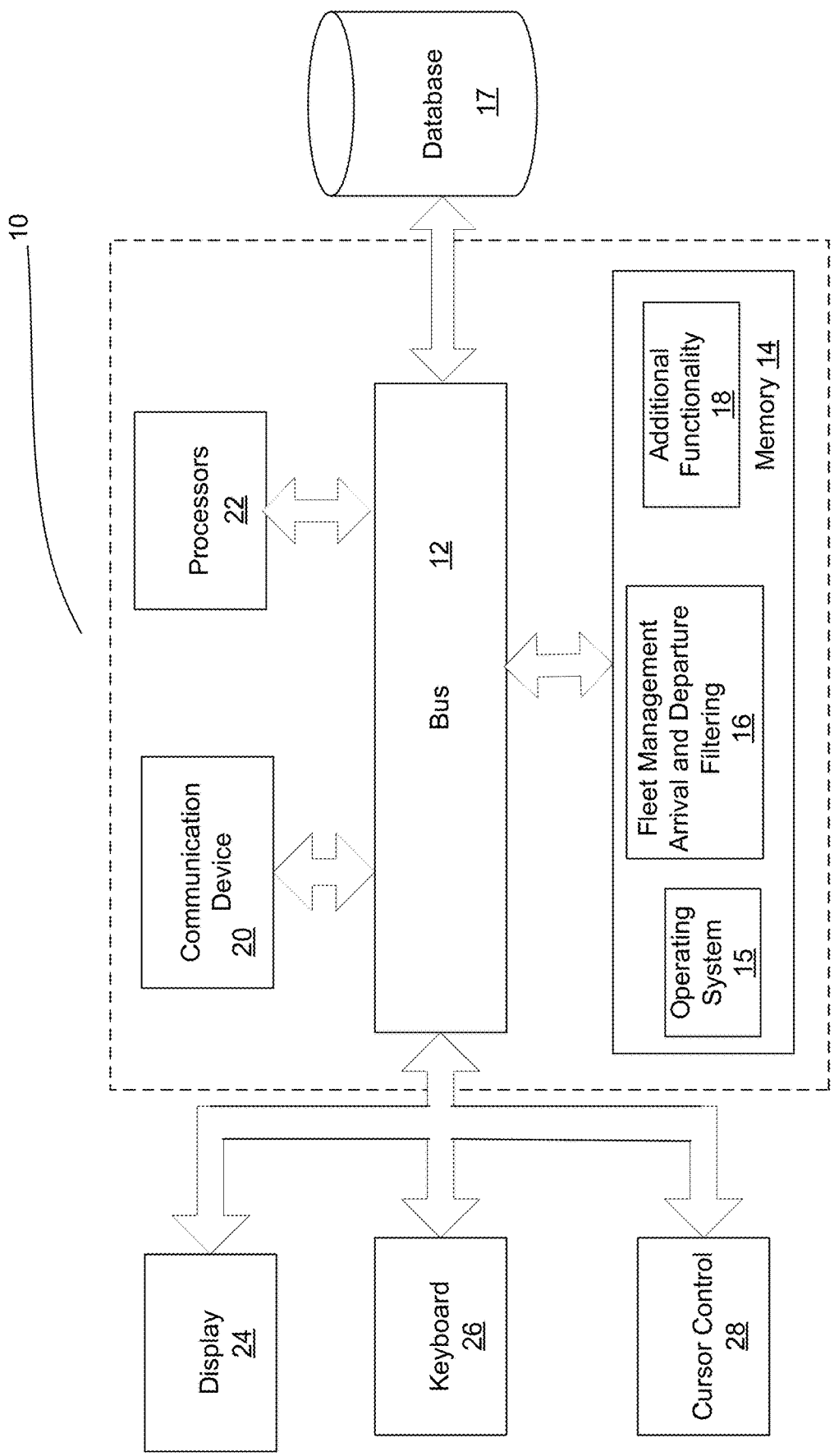
FIG. 2 is a block diagram of fleet management arrival/departure detection filtering of FIG. 1 in the form of a computer server/system in accordance with an embodiment of the present invention.

FIG. 2 is a block diagram of fleet management arrival/departure detection filtering 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fleet management arrival and departure filtering module 16 that provides filtering to distinguish between false arrivals/departures and true arrivals/departures for a pre-planned trip, and all other functionality disclosed herein. System 10 can be part of a larger system. Therefore, system 10 can include one or more additional functional modules 18 to include the additional functionality, such as the "IoT Asset Monitoring Cloud Service" or "IoT Fleet Monitoring Cloud" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments include functionality that is included in a fleet monitoring system that monitors entities including trips, shipments, vehicles, equipment in vehicles, ship-orders, ship-units or packages, ship-items, and the drivers assigned to a trip. The "trip" is a collection of goods that is being transported, has been, or needs to be transported from one geographic location to another. The trip also encompasses the route defined for the movement of the goods.

Figure 3:
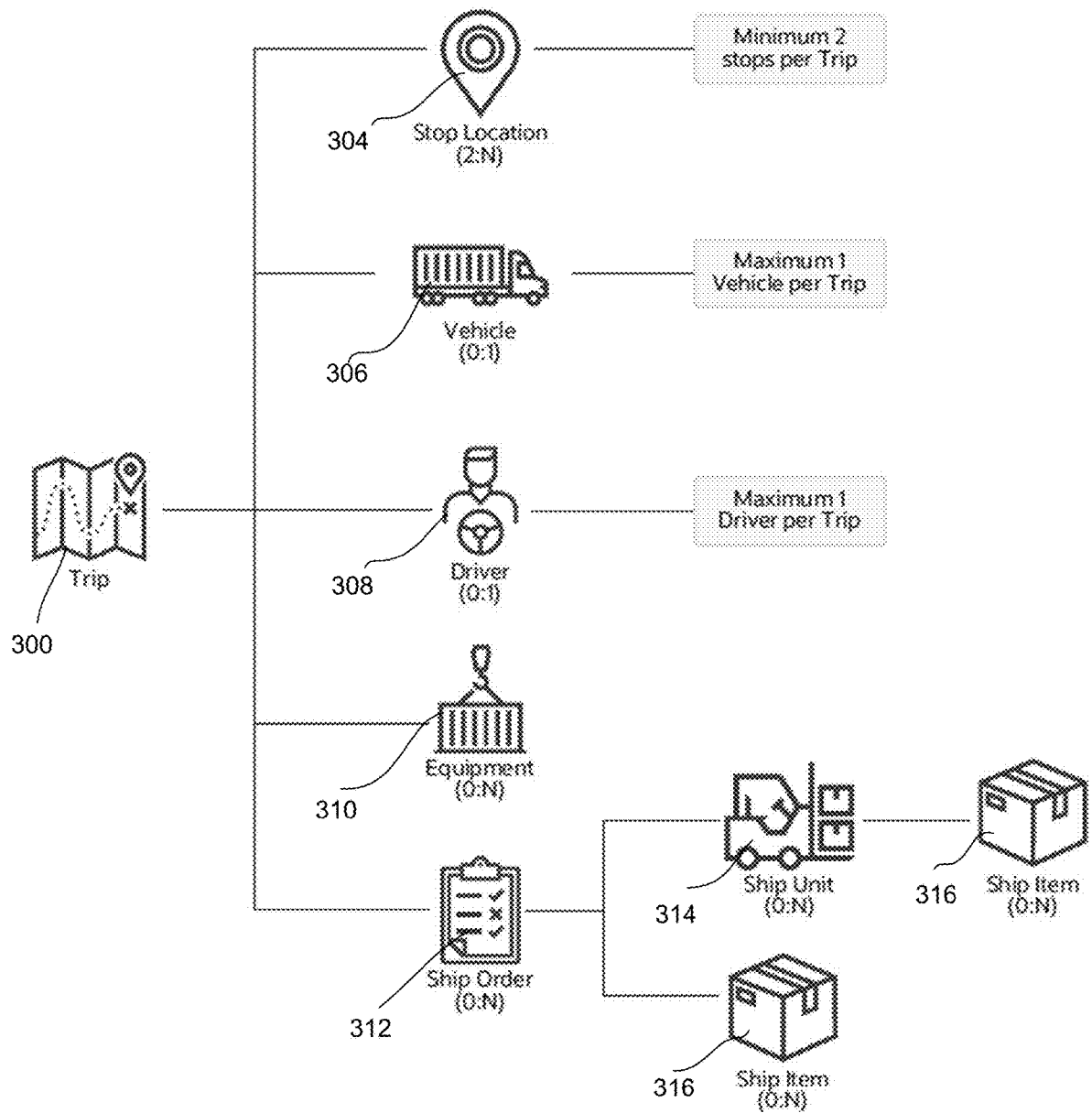
FIG. 3 illustrates the entities/sub-entities that may form a planned trip in accordance to embodiments.

FIG. 3 illustrates the entities/sub-entities that may form a planned trip 300 in accordance to embodiments. In addition to the start location and the final destination location, not shown, sub-entities include stop locations 304, which are the intermediate stops between the source and destination. They are either delivery points or pick up points. Sub-entities further includes a vehicle 306, which is a conveyance such as a truck or a car for transporting inventory from a source location to a stop location.

Sub-entities further includes a driver 308, which is the driver assigned to the trip. Sub-entities further includes equipment 310, which represents any method of storage or transport used for the movement of goods in a trip from one location to another, such as, a trailer, container, flatbed, or a tank, and so on. It can have sensors/trackers attached for measuring attributes including GPS, temperature, humidity, shock, tilt, pressure, and so on.

Sub-entities further include ship-orders 312, which are part of the inventory metadata that contains order information required for transportation of goods from one location to another in a trip. Sub-entities further includes ship-units 314 that are a transportation handling unit that is used to facilitate ease of transportation in a trip. These can be wooden or metallic pallets, boxes, cartons, automotive racks, and so on. A ship-order can contain one or more ship-units. Sub-entities further include ship-items 316 that are an individual trackable inventory item or items that is being transported and monitored in a trip. It can belong to a ship-unit 314 or can be independent of ship-units 314.

Each of the items and sub-items shown in FIG. 3 can be tracked using a corresponding sensor 101 (e.g., an IoT sensor) that transmits the location of the item, and other information if needed, at predetermined time intervals, in the form of messages. The messages are received by fleet management arrival/departure detection filter server 10.

In general, an IoT Fleet Monitoring system such as "IoT Fleet Monitoring Cloud" from Oracle Corp. requires that when a trip is being executed, it should be capable of detecting the actual arrival at, and departure from, planned stops of a trip and record the timestamp of these events. During the execution of the trip, the real time location information of the route traversed is captured by using geo-coordinate sensors continuously at a certain periodicity. These recorded geo-coordinates will be sent to a server monitoring the trip and performing stop arrival and departure detection. This would be the minimal set of requirements for any software to track the location of the trip. With this minimal requirement, the following method is a known solution for detecting the arrival and departure at the stops.

Each planned stop in the trip will have a pair of latitude and longitude sets of geo-coordinates. For each stop, with the geo-coordinates of the stop location as the center, a stop detection radius is determined. This radius could be user defined or a hardwired default used by the trip monitoring component. At any point during the execution of the trip, if the recent known geo-location of the trip falls anywhere within the stop detection radius of the stop, then the arrival at the stop is recorded. Following the arrival detection at a stop, when the last known geo-location of the trip falls outside the stop detection radius of this stop, the trip is considered to have departed from that stop.

The circular geo-fence is necessarily a proximity-based evaluation between the vehicle's location and the stop's location, to determine the arrival and departure. The stop's geo-fence can be made sufficiently large so that the chances of missing the arrival (due to distance between vehicle's coordinates and stop's coordinates not being zero) is eliminated.

Figure 4:
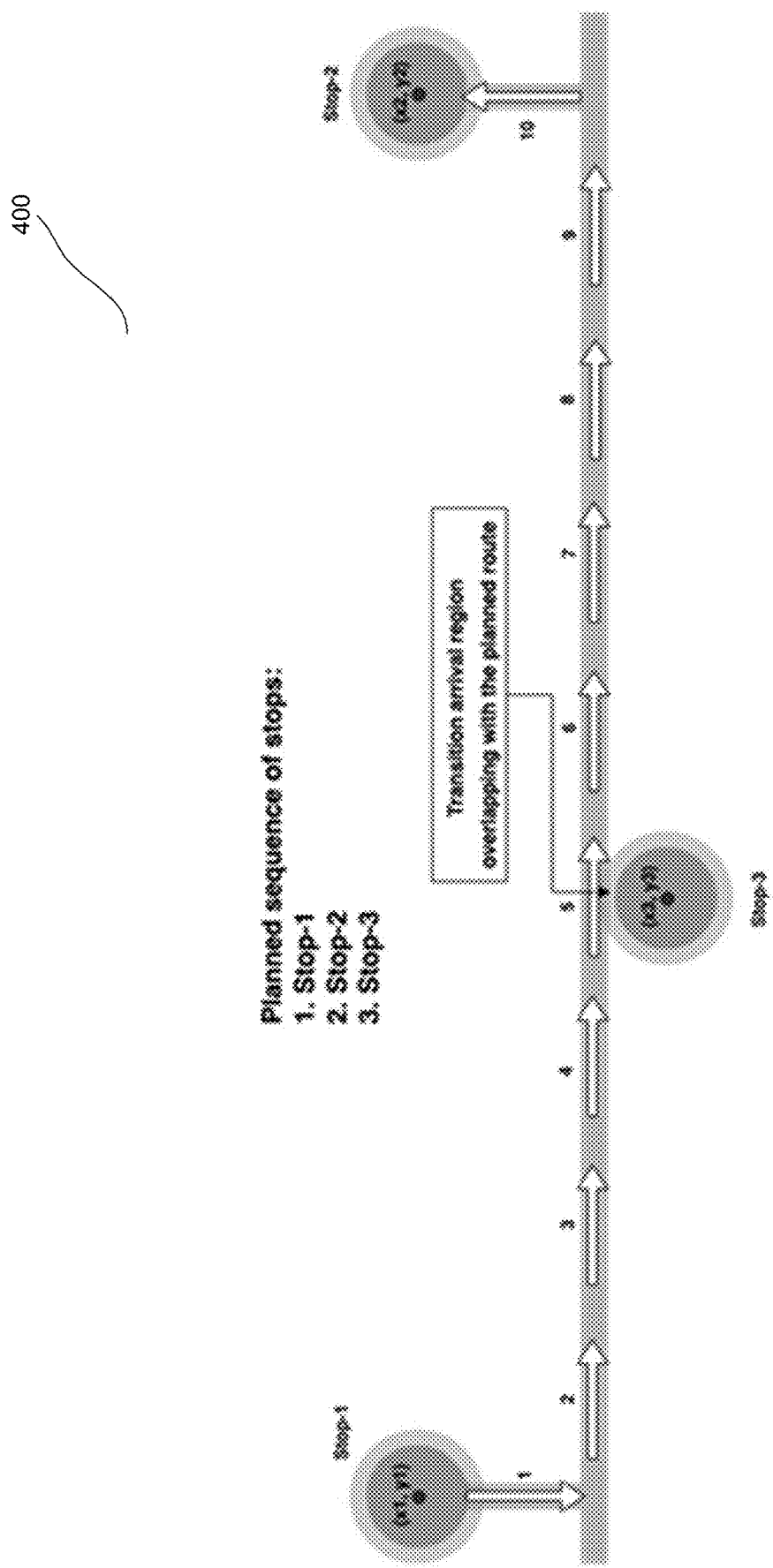
FIG. 4 illustrates an example trip that includes a planned sequence of three stops ("stop-1", "stop-2" and "stop-3") in accordance to embodiments.

FIG. 4 illustrates an example trip 400 that includes a planned sequence of three stops ("stop-1", "stop-2" and "stop-3") in accordance to embodiments. FIG. 4 illustrates that with known systems there can be trips, where the outermost region of the geo-fence of some other stop (i.e., stop-3 in FIG. 4) is overlapping with the actual route being taken currently by the vehicle to reach the next stop (i.e., from stop-1 to stop-2) In this example, the vehicle is merely passing by stop-3, without stopping at the stop's (stop-3's) location. However, with known solutions, if the vehicle passes through the geo-fence of stop-3, by passing through the transitional arrival regions, disclosed below, it will register a false detection of arrival at stop-3.

False positives for arrival or departure are also possible when the vehicle is moving close to the fence boundary and the geo-coordinates recorded by the GPS sensors are not accurate, due to their innate fault tolerance. The problem of false positives is also exaggerated when two different stop geofences are close to each other.

With known solutions, and with no additional sensors or human intervention, in order to automatically detect the arrival event and departure event at these stops, the server will continuously evaluate the vehicle's geo-coordinates against the stop's geo-coordinates for proximity. However, the server cannot automatically differentiate between true arrival-departure events and false arrival-departure events at the trip stops. The server would have to choose to mark the first occurrence of an arrival-departure pair as the true arrival-departure and any successive pair of events as false arrival-departure events.

With known solutions of stop event detection, there is a need for human intervention to accurately distinguish between false and true arrival-departure events at the trip stops. In contrast, embodiments will automatically filter out false arrival-departure events from true arrival-departure events. This ensures that the recorded timings of arrival and departure against the stops automatically are accurate, and the server can do any other additional processing based on these events by avoiding any false triggers.

Embodiments implement a duration based ("Tw") method and a transition region based ("Ra") method to enable server 10 to filter out the false arrival and departure events. Embodiments store multiple pairs of arrival and departure events in order to keep a record of all the events occurring. Embodiments use filtering to accurately mark the true events apart from the false events automatically. The following numbered "evaluations" disclose implementations of embodiments of the invention.

Arrival Detection at a Stop Based on Proximity (Geo-Fence) and the Problem of False Arrival (Known Solutions)—"Evaluation #1"

As disclosed, with known solutions, whenever the vehicle stops within the geo-fence of the stop, the vehicle can be marked as arrived at the stop. After the arrival at the stop is marked, whenever the vehicle exits the geo-fence, the vehicle will be marked as departed from the stop. However, false positives of arrivals may be caused by the following two reasons:

A. With the geo-fence of some other stop (e.g., "stop-N"), is overlapping with the actual route being taken currently by the vehicle to reach the next stop (e.g., "stop-M"), there will be a false detection of arrival at an unexpected stop (stop-N).

B. When vehicle is moving close to the fence boundary and the geo-coordinates recorded by the GPS sensors are not accurate, due to their innate fault tolerance, there will be a false detection of arrival.

With the above, decreasing the stop's (stop-N's) geo-fence to an extent such that the geo-fence will not overlap with the assigned route, will solve the problem of false detection, but it will defeat the purpose of having a sufficiently large enough geo-fence radius so as not to miss an arrival. Therefore, embodiments include an additional evaluation along with the geo-fence (or the proximity) based evaluation.

Arrival Detection Based on Stop Duration (Tw) Along with Proximity (Geo-Fence) to Avoid False Detection—"Evaluation #2"

With EVALUATION #1 above, which is a known solution, false and true arrival-detection events cannot be distinguished. In contrast, using EVALUATION #2 embodiments make use of the timing data from the geo-coordinates that is available from the geo-position sensors. Consider the recorded timing of the geo-coordinates sent by the vehicle.

When a vehicle reaches a stop, under ideal circumstances, the vehicle would stop for some necessary time duration at the stop's location to carry out the planned activities at the stop. However, in reality, the time duration for which the vehicle stops at a location to carry out the planned activities is variable and dependent on the kind of activities scheduled or planned at that stop. Consider the example where the activity at the "stop-M" is to drop off some inventories and pick-up some other inventories. In this example, the duration of stoppage of the vehicle could be relatively long (e.g., 1 hour). As such, the server can wait for 15 mins (0.25×1 hour) after the first geo-coordinate inside the stop's (stop M's) geo-fence is recorded. At the end of 15 mins., the vehicle will still be inside the stop's geo-fence, so the server will mark the stop (stop-M) as arrived at the end of 15 mins, and the recorded arrival time can still be the time recorded from the first geo-coordinate message that pointed inside the stop fence. Consider the example where the "stop-N" geo-fence was overlapping with the route of the trip, and the vehicle was passing by this stop's (stop-Ns) geo-fence, and it never stopped at this stop's (stop-N's) location. Then by the end of 15 mins. after the first geo-coordinate inside the stop's (stop-N's) fence is recorded, the vehicle would have moved away from the stop's (stop-N's) geo-fence, and the server can conclude that this particular arrival event was a false arrival event.

In general, for EVALUATION #2, before concluding the arrival event, the server will wait for a determined time duration after the first geo-coordinate pointing inside the geo-fence of the stop is recorded. The waiting time duration will be a fraction of the planned stop duration. If at the end of this waiting time, if the vehicle is still within the geo-fence of the stop, then the server will mark it as a true arrival event, and the arrival time will be the time indicated by the first geo-coordinate pointing inside the geo-fence. Similarly, if by the end of this waiting time the vehicle has moved outside of the stop fence, then the server will conclude it as a false arrival event. In summary:

EVALUATION #2: Waiting time duration=Tw=(planned stop duration)×(k)

Where:
k is a fractional number such that: $0.25 \leq k < 0.5$;
min limit for Tw=2 mins;
min limit for Tw=15 mins;

a) The server will wait for the time duration "Tw", after recording the first geo-coordinate inside the geo-fence, before concluding whether the arrival is a true arrival or a false arrival event.

b) If within the waiting time duration window "Tw", there are no events that are in contrary to the initially detected event, then the initially detected event will be decided as a true event. In contrast, within this time duration, if there is any event that is in contrary to the initially detected event, then the initially detected event will be decided as a false event. For an initially detected arrival event, a departure will be a contrary event. For an initially detected departure event, an arrival will be a contrary event.

Using the "EVALUATION #1" and "EVALUATION #2" together, consider the false arrival case where the vehicle is passing by the stop's geo-fence, without stopping inside the stop's fence. At the end of waiting period, the vehicle would have moved away from the stop's geo-fence, hence it will be indicated as false arrival. If it's the true case of arrival, where the vehicle is indeed stopping inside the stop's geo-fence, then it will be marked as the true arrival event at the end of waiting time, because the vehicle's location is still inside the stop's geo-fence.

Arrival Detection Based on a Transitional Arrival Region (Ra) Along with Stop Duration (Tw) and Proximity (Geo-Fence)—"Evaluation #3"

Using EVALUATION #1 and EVALUATION #2 disclosed above, the necessary stop duration at a stop's location could not be exceeded. For example, in the case of passenger service trips such as buses and cabs, the alighting and boarding of the passengers may take a minimal amount of time, so that the vehicle's presence at the stop's location even for just two minutes will be sufficient. In such cases, the previous condition that the vehicle should be present inside the stop's geo-fence for some minimum duration cannot be satisfied, and hence such arrival could be concluded as a false arrival event. The success of EVALUATION #2 in identifying the true arrival depends on the duration of stoppage of the vehicle inside the stop's geo-fence. For any case where the duration of stoppage is less than the waiting time duration window "Tw", the EVALUATION #2 would mark it as false arrival.

This means that if there is no minimal time duration for marking the event as a true arrival, the arrival event will not be missed. But removing the waiting time would mean that the server will also lose out on the advantage of the duration-based filter. So, instead of removing the waiting time, embodiments provide the server with an additional way of filtering out the false arrivals, for such cases with very small stop durations.

Figure 5:
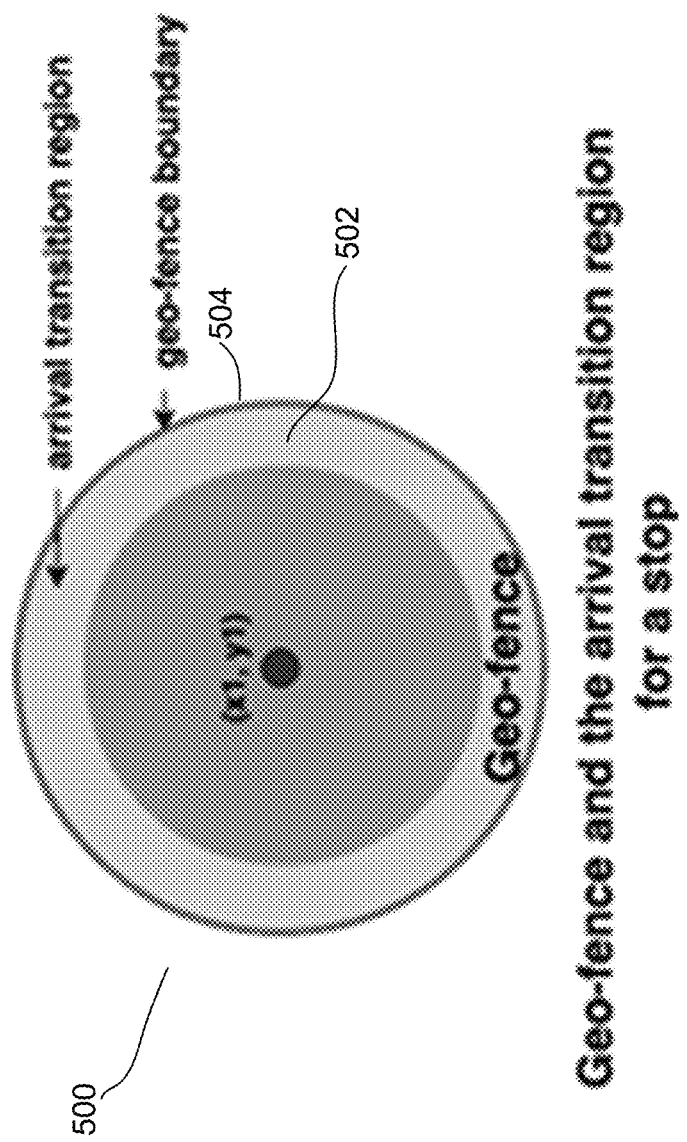
FIG. 5 illustrates a stop with an arrival transition region in accordance to embodiments.

To address the shortcomings of EVALUATION #2, embodiments add a transition region that covers the outermost region of the stop fence. FIG. 5 illustrates a stop 500 with an arrival transition region 502 in accordance to embodiments. Transition region 502 in embodiments is located just inside the boundary of the stop fence 504 so it is within the geo-fence of the stop and surrounded by the boundary of the geo-fence.

The first geo-coordinate from the vehicle that points inside transition region 502 marks the arrival event, but this event will be marked as a transitional arrival event, or a tentative event, which will later be decided as a true arrival or a false arrival based on the duration-based method of filtering. The "Tw" duration-based filtering is applied only for the case when the geo-coordinate that triggered the arrival points to the transitional arrival region. The arrival event is marked as the true arrival event as soon as a geo-coordinate is recorded that points to a region inside the stop fence beyond transition region 502 (i.e., closer to the stop's geo-coordinate (x1, y1)). However, if there are no further geo-coordinates after the initial transitional arrival event, then the duration-based filtering is used to determine if the arrival event is true or false.

Transition region 502 will also serve to eliminate any noise around the boundary of the fence (i.e., a depth of STOP-RADIUS×0.1 around the stop fence is considered as a noisy region). The noise can be originating due to the inherent sensitivity errors of the geo-location sensors. Even if the vehicle is not within the stop's geo-fence but is present outside but just close enough to the stop boundary, the geo-positioning sensor can wrongly indicate the geo-coordinate of the vehicle as pointing at a location inside the geo-fence of the stop. For example, standard GPS sensors are known to have an inaccuracy in the range of 10-20 meters. In summary:

EVALUATION #3: Transition region for arrival=Ra

Ra=(Radius of stop's geo-fence)×($j$), starting from the boundary of the geo-fence, ranging towards the center of the stop.

Where:

max permissible limit for Ra is 500 m.

"$j$" is a decimal number such that: $0.1 \leq j < 1$

For example, if $j=0.1$ and if the stop's geo-fence has a radius of 500 meters, the transition region for arrival will be: 500 meters×0.1=50 meters, starting from the boundary of the geo-fence, ranging towards the center of the stop. This 50 m stretch inside the boundary is considered as the region for the transitional arrival.

a) If the first geo-coordinate that marks the arrival event is pointing to this transitional arrival region, then the server waits until the end of the waiting period (Tw) before marking it as a true or conclusive arrival event.

b) If the first geo-coordinate that triggered the arrival detection (from EVALUATION #1) then the arrival is marked as a transitional arrival event. After the transitional arrival event until the end of waiting period, "Tw" (as per EVALUATION #2), if the vehicle has not sent any geo-coordinate that points outside of the geo-fence, then the transitional arrival event will be marked as true arrival event.

c) After the transitional arrival, if the vehicle has sent any geo-coordinate that points outside of the geo-fence, before the end of waiting period, then the transitional arrival event will be marked as a false arrival event.

d) If the first geo-coordinate that points inside the geo-fence falls beyond this transitional arrival region, then the corresponding arrival event is marked as the true or conclusive arrival event, instantaneously without any further evaluations.

The evaluations of EVALUATION #1, EVALUATION #2 and EVALUATION #3, together, will address the case of passenger service trips such as buses or cabs, where the stop duration can be as small as 2 mins. In such cases, if the vehicle has reached the region well inside the stop fence (i.e., beyond the transitional arrival region), then the vehicle need not be present inside the stop fence for any longer than necessary for it to be marked as arrived at the stop.

Departure Detection Based on a Transitional Departure Region Along with Stop Duration and Proximity—Evaluation #4

Figure 6:
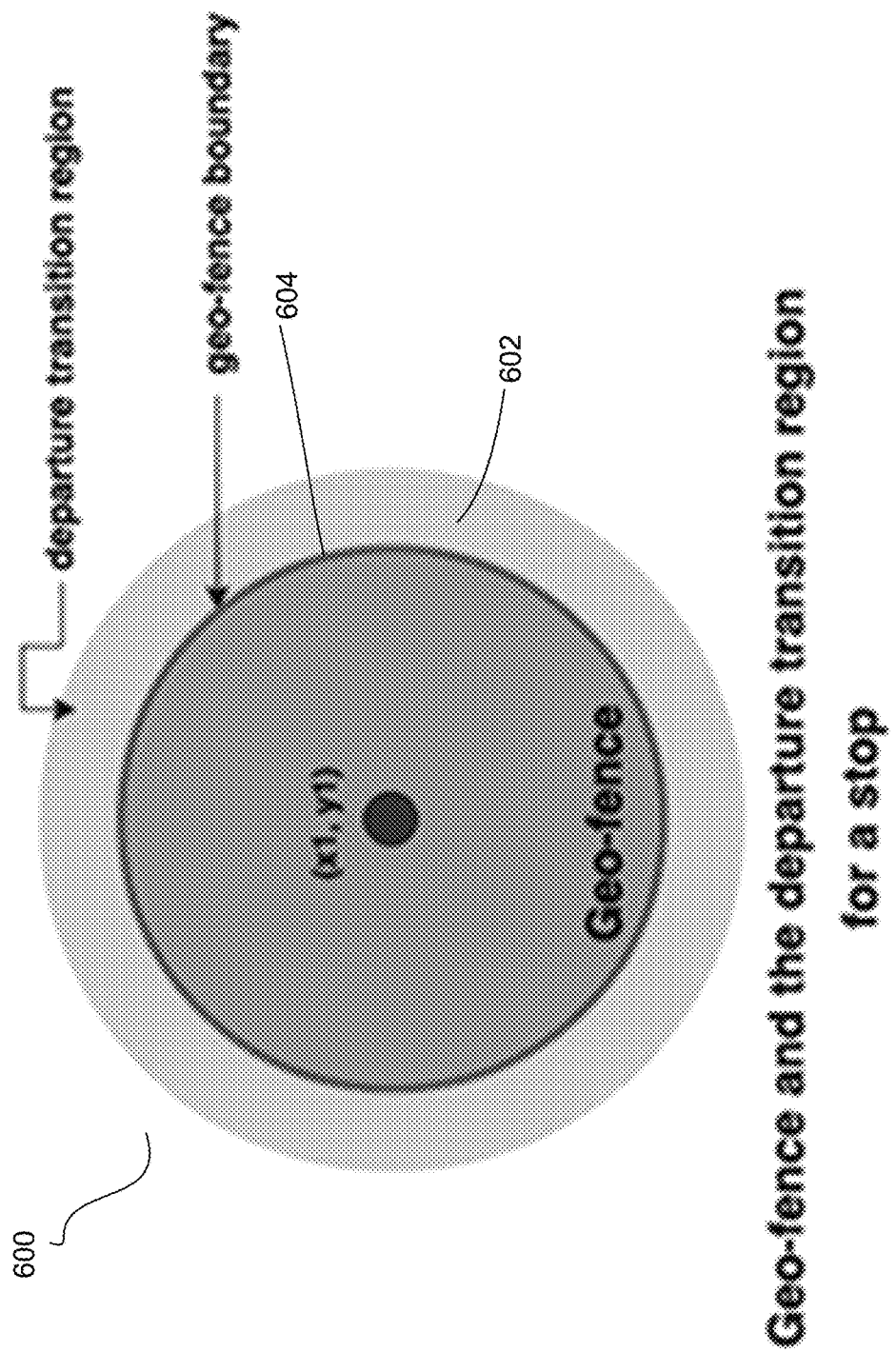
FIG. 6 illustrates a stop with a departure transition region in accordance to embodiments.

After the arrival is detected and marked, if the scheduled activity is completed at the stop, the vehicle will start moving away from that stop's location. After travelling some distance away from the stop, the vehicle can be considered to have departed from the stop. The stop's geo-fence is used for deciding the time of departure. After an arrival is detected, the first geo-coordinate message from the vehicle that points outside of the stop's geo-fence will be considered as the departure event. As in the case of arrival events, in order to filter out the false departure events, transition region-based filtering can be applied during departure detection. FIG. 6 illustrates a stop 600 with a departure transition region 602 in accordance to embodiments. Departure transition region 602 is outside the geo-fence 604 of the stop, and it surrounds the geo-fence boundary.

After the arrival, if the first geo-coordinate from the vehicle that points outside geo-fence 604 points inside departure transition region 602, then it will be marked as a transitional departure, which will later be decided as a true departure or a false departure based on the duration-based method of filtering. The "Tw" duration-based filtering is applied only for the case when the geo-coordinate that triggered the departure points to departure transition region 602. The departure event is marked as true departure event as soon as a geo-coordinate is recorded that points to a region outside of the stop fence beyond departure transition region 602 (i.e., far away from the stop's geo-coordinate). However, if there are no further geo-coordinates after the initial transitional departure event, then the duration-based filtering is used to determine a true or false departure event.

This transition region is introduced for departure events to filter out any false departures occurring due to the vehicle being stopped too close to the boundary of the stop's geo-fence, and then, due to the inherent sensitivity of the GPS sensors, the recorded geo-coordinate could indicate a location as outside of the stop fence. In summary:

EVALUATION #4: Transition region for departure=Rd
Rd=(Radius of stop's geo-fence)×(j), starting from the boundary of the geo-fence, ranging outwards from the center of the stop.
Where:
max limit for Rd is 500 m
"j" is a decimal number such that: $0.1 <= j < 1$
For example, if j=0.1 and if stop's geo-fence has a radius of 500 meters, the transition region for departure will be: 500 meters×0.1=50 meters, starting from the boundary of the geo-fence, ranging outwards from the center of the stop. This 50 m stretch outside the stop boundary is considered as the region for the tentative departure.
a) If the first geo-coordinate that marks departure event is pointing to this transitional departure region, then embodiments wait until the end of the waiting period before marking it as true or conclusive departure event.
b) If the first geo-coordinate ping falls beyond this transition region outside of the stop fence, then the corresponding departure event is marked as the true or conclusive departure event, immediately without any further evaluations.
c) After the first geo-coordinate that points to the transitional departure region (hence marks the tentative departure event), if the vehicle has not sent any geo-coordinate that points inside of the geo-fence, until the end of waiting period, then the tentative departure event will be concluded as the true departure event.
d) After the first geo-coordinate that points to the transitional departure region (hence marks the tentative departure event), if the vehicle has sent any geo-coordinate that points inside the geo-fence, before the end of waiting period, then the tentative departure event will be concluded as a false departure event.

Separation Time Period Window Between Departure Event and Arrival Event for Repeated Stops, and Repeating of any Extra Arrival-Departure Events Against all Repeated Stop—Evaluation #5

In embodiments, there may be trips which can have multiple stops with the same geo-coordinates and therefore such stops will share the same stop fence. Such stops are referred to as repeated stops. In such trips, the repeated stops will be separated by different stops in the planned sequence of stops.

Figure 7:
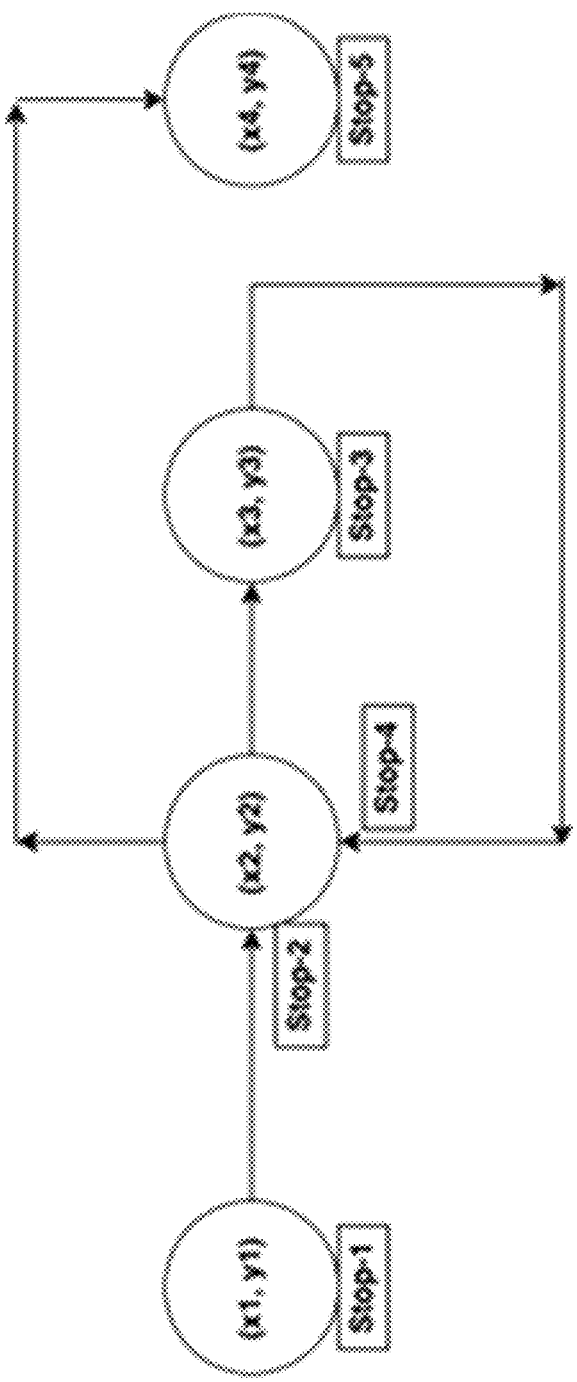
FIG. 7 illustrates an example trip with a repeated stop at stop-2 and stop-4.

FIG. 7 illustrates an example trip with a repeated stop at stop-2 and stop-4. As shown in FIG. 7, in a planned trip, a stop (e.g., Stop-1) will be scheduled to be covered as the 1st stop, then a different stop as the 2nd stop (e.g., Stop-2), then a different stop as the 3rd stop (e.g., Stop-3), and then the earlier stop-2 (repeated stop-2) as the 4th stop.

For such a trip, consider the case where the 2nd stop (stop-2) is arrived and departed. The route towards the next stop (stop-3) is overlapping with the geo-fence of stop-2. Hence as the vehicle departs this stop, the vehicle re-enters the geo-fence of this stop (stop-2) for a brief moment. In such a case, although the arrival may be identified to be recorded as a false arrival (because the vehicle is only inside the transitional arrival region and the vehicle has not stopped inside the fence), the server still needs to determine if this false arrival needs to be recorded against the 2nd stop (stop-2) or the 4th stop (repeated stop-2).

On the other hand, consider the case where, after covering the 2nd stop (stop-2), the vehicle has indeed departed the stop completely and then reached the 3rd stop (stop-3), and then arrived at the 4th stop (repeated stop-2). In this case the server should assign the first arrival and departure at stop-2 against the 2nd stop and the last arrival at stop-2 against the 4th stop.

Consider also, due to network outage, the arrival at the 3rd stop (stop-3) was missed, and therefore the departure at stop-3 is also missed. In such a case, the server should be able to automatically allocate the last arrival at stop-2 against the 4th stop, instead of allocating the last arrival at stop-2 against the 2nd stop.

For enabling the server to make the above distinctions for the arrival and departure events at the repeated stops, embodiments include a time duration-based separation between the departure event from the first stop and the arrival event at the next occurrence of the same stop. In summary:

EVALUATION #5: Separation time period window for repeated stops (i.e., another occurrence of the stop with the same stop fence): =Sw=(time required to reach the next stop)
Where:
max allowed value for the Sw will be 15 mins,
min allowed value for the Sw will be 5 mins.
a) After the last departure event, and before the elapsing of this separation time duration, any and all arrival and departure events will be marked against the same (i.e., already covered) stop, regardless of whether the arrival and departure events are true events or false events. It is only after the elapsing of this separation time duration, that the next arrival and departure events will be allocated to the next occurrence of the repeated stop.
b) Also, after the departure from the previous stop, if the trip covers a different stop, before visiting the next occurrence of the previous stop, then the intermediate stop also acts as a marker for the separation of the events between the repeated stops.

The resulting behavior is that, for the arrival and departure to cover the successive repeated stops:
a) The first repeated stop should have true arrival and departure events. The time between the departure at the first repeated event and new arrival event should be greater than the calculated time separation window (15 minutes in this case).
b) If there should be a stop in between the two repeated stops with recorded true arrival and departure events, then the calculated time separation window does not apply. In summary:

EVALUATION #6: After all repeated stops are visited (i.e., at-least one pair of true arrival and departure against each repeated stop), any new arrival and departure events will be recorded against all the repeated stops as false events.
a) This will make all the repeated events to be available for correction by the user for all the stops (i.e., the user or driver can set the flag of the appropriate event for any stop required). Any corrections to the arrival and departure timings can be done by toggling the record flag of the event to true or false.

Figure 8:
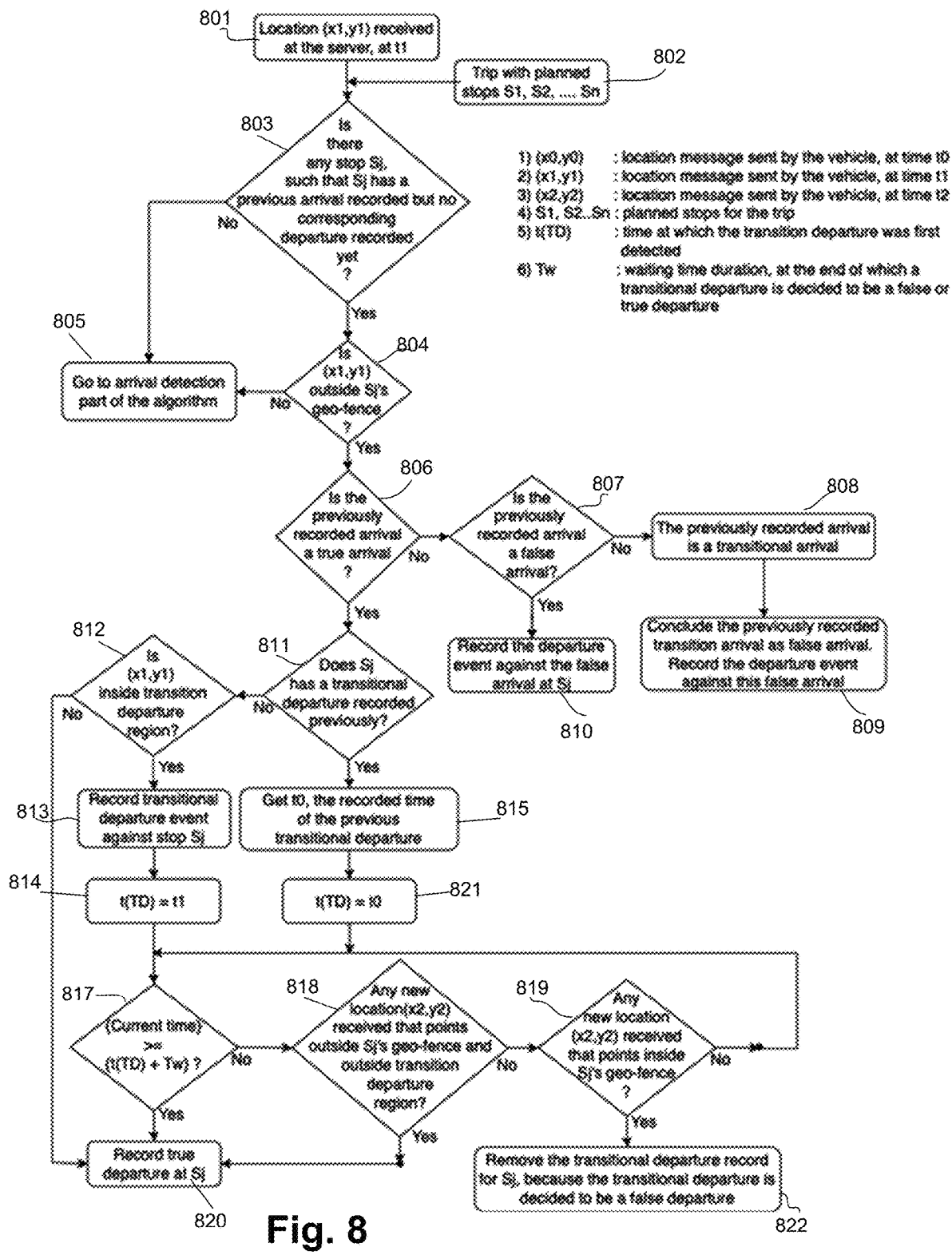
FIG. 8 is a flow diagram of the functionality of fleet management arrival and departure filtering module of FIG. 2 for performing departure event detection with filtering (i.e., determining if a departure at a stop is a true departure) in accordance with one embodiment.

FIG. 8 is a flow diagram of the functionality of fleet management arrival and departure filtering module 16 of FIG. 2 for performing departure event detection with filtering (i.e., determining if a departure at a stop is a true departure) in accordance with one embodiment. In one embodiment, the functionality of the flow diagram of FIG. 8 (and FIGS. 9 and 10 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 8 is based on a planned trip 802 for a vehicle with stops S1, S2 . . . Sn. At 801, a location (x1, y1) is received at time t1. At 803, it is determined if there is any stop Sj, such that Sj has a previous arrival recorded but no corresponding departure recorded yet? If no, at 805 the functionality resumes at the arrival detection functionality of FIG. 9 below at 903.

If yes at 803, at 804 it is determined if the location (x1, y1) is outside stop Sj geo-fence. If no, at 805 the functionality resumes at the arrival detection of FIG. 9 below at 903. If yes, at 806 it is determined if the previously recorded arrival is a true arrival.

If no at 806, at 807 it is determined if the previously recorded arrival is a false arrival. If yes at 807, at 810 the departure event is recorded against the false arrival at Sj. If no at 807, at 808 the previously recorded arrival is considered a transition arrival and at 809 the previously recorded transition arrival is considered a false arrival and the departure event is recorded against this false arrival.

If yes at 806, at 811 it is determined if the Sj has a transitional departure previously recorded. If no at 811, at 812 it is determined if location (x1, y1) is inside the transition departure region. If yes at 812, at 813 a transitional departure event is recorded against stop Sj. At 814, "t(TD)", the time at which the transition departure was first detected, is set to t1.

If yes at 811, at 815 t0, the recorded time of the previous transitional departure, is retrieved. At 821, t(TD) is set to t0.

At 817, the time based filter is implemented by determining if the (Current time)>=(t(TD)+Tw), where "Tw" is the waiting time duration, at the end of which a transitional departure is decided to be a false or true departure. If yes at 817, at 820 the true departure at Sj is recorded.

If no at 817, the location based filter is implemented at 818 by determining if any new location (x2, y2) was received that points outside of Sj's geo-fence and outside the transition departure region. If yes at 818, at 820 the true departure at Sj is recorded.

If no at 818, at 819 it is determined if any new location (x2, y2) was received that points inside of Sj's geo-fence. If no at 819, functionality continues at 817. If yes at 819, at 822 the transitional departure record is removed for Sj because the transition departure is determined to be a false departure.

Figure 9:
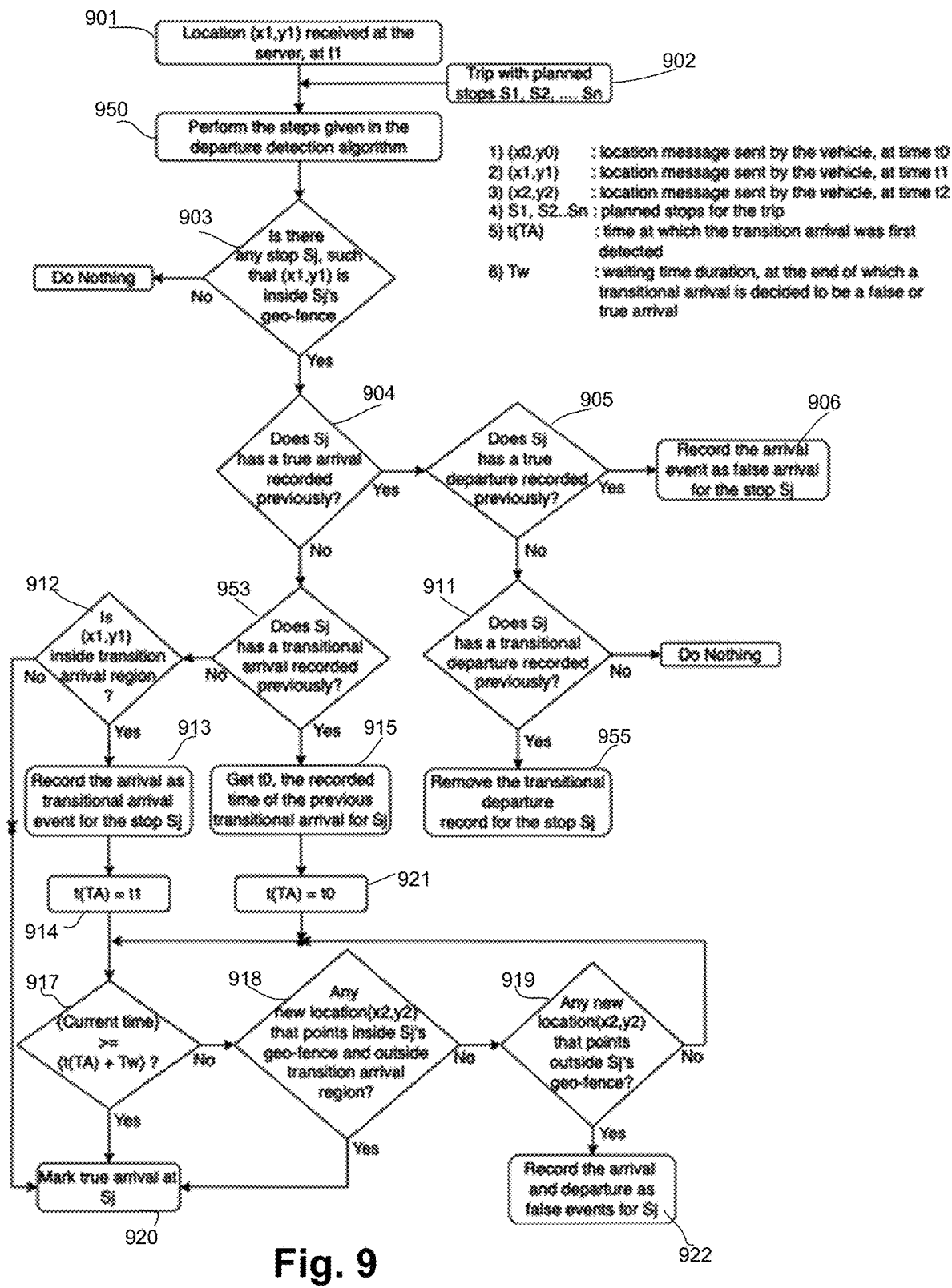
FIG. 9 is a flow diagram of the functionality of fleet management arrival and departure filtering module of FIG. 2 for performing arrival event detection with filtering (i.e., determining if an arrival at a stop is a true arrival) in accordance with one embodiment.

FIG. 9 is a flow diagram of the functionality of fleet management arrival and departure filtering module 16 of FIG. 2 for performing arrival event detection with filtering (i.e., determining if an arrival at a stop is a true arrival) in accordance with one embodiment.

The functionality of FIG. 9 is based on a planned trip 902 for a vehicle with stops S1, S2 . . . Sn. At 901, a location (x1, y1) is received at time t1. At 950, the functionality of FIG. 8 is performed, which at 805 will return to 903 of FIG. 9. At 903, it is determined if there is any stop Sj, such that Sj is inside Sj's geo-fence. If no at 903, functionality ends. If yes at 903, at 904 it is determined if Sj has a true arrival recorded previously.

If yes at 904, at 905 it is determined if Sj has a true departure recorded previously. If yes at 905, at 906 the arrival event is recorded as a false arrival for Sj. If no at 905, at 911 it is determined if Sj has a transitional departure previously recorded. If no at 911, functionality ends. If yes at 911, at 955 the transitional departure record for Sj is removed.

If no at 904, at 953 it is determined if Sj has a transitional arrival previously recorded. If no at 953, at 912 it is determined if location (x1, y1) is inside the transition arrival region. If yes at 912, at 913 a transitional arrival event is recorded against stop Sj. At 914, "t(TA)", the time at which the transition arrival was first detected, is set to t1.

If yes at 953, at 915 t0, the recorded time of the previous transitional arrival, is retrieved. At 921, t(TA) is set to t0.

At 917, the time based filter is implemented by determining if the (Current time)>=(t(TA)+Tw), where "Tw" is the waiting time duration, at the end of which a transitional arrival is decided to be a false or true arrival. If yes at 917, at 920 the true arrival at Sj is recorded.

If no at 917, at 918, the location based filter is implemented at 918 by determining if any new location (x2, y2) received that points inside of Sj's geo-fence and outside the transition arrival region. If yes at 918, at 920 the true arrival at Sj is recorded.

If no at 918, at 919 it is determined if any new location (x2, y2) received that points outside of Sj's geo-fence. If no at 919, functionality continues at 917. If yes at 919, at 922 the arrival and departure for Sj are recorded as false events.

Figure 10:
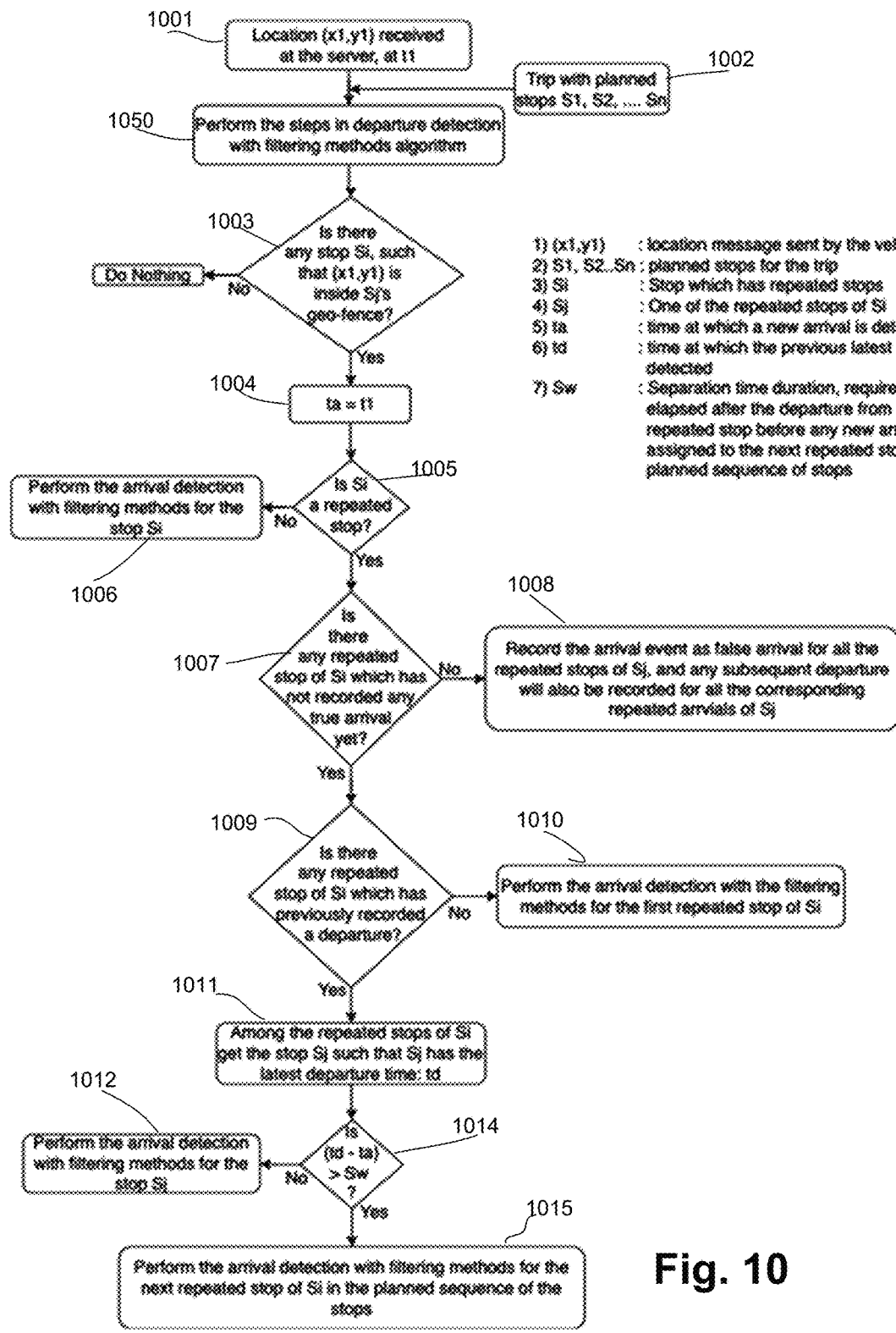
FIG. 10 is a flow diagram of the functionality of fleet management arrival and departure filtering module of FIG. 2 for handling stop events separation for repeated stops (e.g., round trips where the source and destination is the same) in accordance with one embodiment.

FIG. 10 is a flow diagram of the functionality of fleet management arrival and departure filtering module 16 of FIG. 2 for handling stop events separation for repeated stops (e.g., round trips where the source and destination is the same) in accordance with one embodiment.

The functionality of FIG. 10 is based on a planned trip 1002 for a vehicle with stops S1, S2 . . . Sn. At 1001, a location (x1, y1) is received at time t1. At 1050, the functionality of FIG. 8 is performed. At 1003, it is determined if there is any stop S1 (i.e., a stop which has repeated stops, while Sj is one of the repeated stops of S1), such that (x1, y1) is inside Sj's geo-fence. If no at 1003, the functionality ends. If yes at 1003, at 1004 it is determined if ta (i.e., the time at which a new arrival is detected)=t1.

At 1005, it is determined if S1 is a repeated stop. If no 1005, at 1006 functionality continues to the arrival detection functionality of FIG. 9. If yes at 1005, at 1007 it is determined if there are any repeated stop of S1 which has not recorded any true arrival yet.

If no at 1007, at 1008 the arrival event is recorded as a false arrival for all the repeated stops of Sj, and any subsequent departure will also be recorded for all the corresponding repeated arrivals of Sj). If yes at 1007, at 1009 it is determined if there is any repeated stop of S1 which has not recorded any true arrival yet.

If no at 1009, at 1010 the functionality of FIG. 9 is performed for arrival detection with filtering for the first repeated stop of S1. If yes at 1009, at 1011, among the repeated stops of S1, the stop Sj is retrieved such that Sj has the latest departure date, "td".

At 1014, it is determined if (td−ta)>Sw, where Sw is the separation time duration required to be elapsed after the departure from the previous repeated stop before any new arrival is assigned to the next repeated stop in the planned sequence of stops.

If no at 1014, at 1012 the functionality of FIG. 9 is performed for arrival detection with filtering for the first repeated stop of S1. If yes at 1014, at 1015 the functionality of FIG. 9 is performed for arrival detection with filtering for the next repeated stop of S1 in the planned sequence of the stops.

"stopDetectionEvents" Model

In embodiments, the "stopDetectionEvents" model for a stop is as follows:

```
{
    ...
    "stopDetectionEvents": [
        {
            "arrivalTime": 1629331738739,
            "tentativeDepartureTime": 1629331753534,
            "detectionSequence": 0,
            "recorded": true
        }
    ]
    ...
}
``` a) The "stopDetectionEvents" stores an array of stop detection event records (i.e., arrival-departure event pairs).
b) The "recorded" flag is used to mark whether the recorded arrival is a true arrival or false arrival. The "recorded" flag will be false for a transitional arrival and false arrival. If the transitional arrival gets transitioned into a true arrival, then the "recorded" flag will be updated to true.
c) The temporary field "tentativeDepartureTime" in a "stopDetectionEvents" is used to mark the time when the transitional departure was detected for the first time. The "tentativeDepartureTime", will finally transition into "departureTime". The "tentativeDepartureTime" field will store an epoch time-stamp to indicate the initial tentative departure. The "tentativeDepartureTime" will be deleted on detection of a false departure as described earlier, i.e., whenever there is an arrival event before the end of the time duration window "Tw". Once the departure is completed conclusively, then the value stored in "tentativeDepartureTime" will be renamed to "departureTime". This transition of "tentativeDepartureTime" into "departureTime" is triggered either by i) a geo-coordinate message by the vehicle pointing well beyond the transitional departure region, outside the fence or, ii) by a scheduled job after waiting for the waiting time duration after an initial tentative departure.
d) "tentativeDepartureTime" field will be added to the "stopDetectionEvents", only for a true arrival event, i.e., the arrival event with the "recorded" flag set to true, and the departure is tentative. Also, "tentativeDepartureTime" field will be absent in the following cases:
a. When any arrival has not been detected;
b. When the arrival is in tentative state;
c. After the departure has concluded.

Any arrival event, after an initial transitional departure and before marking the departure as true or false, is used to identify the departure as false.

Adding a New Persistence Layer to Store the Transition or Tentative Events Until the Events Become Conclusive Embodiments add the following table for storing the transitional arrival or departure events:

Columns and the Description
1. trip_id and stop_number: the composite key to identify stops of a trip.
2. expiration_time: The exact time till which the server needs to wait before the event can be considered as true or false based on the duration-based filtering.
3. is_arrival: boolean, to indicate if this entry is for arrival or departure.
   geolocation: geo-coordinate of the transitional arrival or departure event.

Embodiments add the following new table for storing tentative events:

```
create table FM_STOP_BOUNDARY_EVENTS ('
   || 'TRIP_ID    VARCHAR2(255) NOT NULL, '
   || 'STOP_NUMBER   INTEGER   NOT NULL, '
   || 'EXPIRATION_TIME  TIMESTAMP  NOT NULL, '
   || 'GEOLOCATION   VARCHAR2(50) NOT NULL, '
   || 'IS_ARRIVAL    CHAR(1)   NOT NULL, '
   || 'constraint PK_STOP_BOUNDARY_EVENTS primary key (TRIP_ID))';
--INDEX ---
create index IDX_FM_STOP_BOUNDARY_EXP_TIME on FM_STOP_BOUNDARY_EVENTS (EXPIRATION_TIME);
```

Some characteristics of the above table are as follows:
1. For a trip there can be at maximum only 1 entry in this table.
2. This table should be ideally empty, if there are no in progress trips.
3. The "expiration_time" in this table is actually the expiration time of the data in this table. Whenever the current time goes past the expiration time instant, this row can be deleted.
   The "expiration_time" is nothing but the sum of the time instant at which the transitional event was first detected, and the waiting time duration "Tw" i.e., "expiration_time"=Transition event time instant+ Tw.
4. The deletion operation should translate to transitioning the corresponding transitional events into true events or into false events. The transitioning into true events is taken care of by the scheduled job, a delay of 2 mins can be expected in deleting the expired rows. The transitioning into false events is done when a contrary event occurs for a transitional event before the "expiration_time".

Adding a Scheduled Job to Transition the Tentative Events into Conclusive Events Embodiments add a scheduled job whose function is the following: This scheduled job is implemented using an IoT job scheduler framework. A single job will be run periodically to get the entries from the database and spawn a thread for processing each entry. The job will be run once every 2 mins:
1. Select all the entries for which the current time has gone past the expiration time, in the increasing order of the expiration time. For the trip stop whose "tripId" and the "stopNumber" is given in the entry, perform the following tasks.
2. If the entry is for an initial transitional arrival then set the "recorded" flag as true for the stop.
3. If the entry is for a previously non-concluded departure then rename the "tentativeDepartureTime" field into "departureTime" as true for the stop.
4. Delete the tentative or transitional arrival or departure events from the DB table.

Pseudocode for Implementing Embodiments

The following pseudocode implements embodiments of the invention. It is assumed that the vehicle is sending the geo-coordinate messages, which is treated as the source of location information of the trip. The below pseudocode can be applied for any geo-coordinate sensor as the source of the location information of the trip being carried out.
1) When the incoming geo-coordinate message points inside a stop fence, then:
  a) if initial transitional arrival (i.e. inside the fence, and inside the transition region)
    i) if the arrival event is new then (i.e. there is no entry in the DB table for transitional arrival for the stop)
      (1) mark the entry with "recorded" as false
      (2) Create a transitional arrival entry in the DB table, which will be picked up by the scheduled job after waiting for the time duration "Tw".
    ii) if the arrival event is not new but follows a previously occurred transitional arrival (i.e. entry is present in the DB table for transitional arrival for the stop)
      (1) if this event is past the expiration time,
        (a) then update the "recorded" to be true.
        (b) delete the transitional arrival entry from the DB table.
  b) if conclusive arrival (i.e. well inside the fence beyond the transition region)
    i) mark the arrival as conclusive, i.e. with "recorded" as true
    ii) check the DB
      (1) if the arrival event is new (i.e. there is no entry in the DB table for transitional arrival for the stop), then nothing else.
      (2) if arrival is not new then clear/delete the transitional arrival entry for this stop from the DB table. So that no further processing is required by the scheduled job.
2) When the incoming geo-coordinate message points outside a stop's geo-fence, whose departure is not yet detected, then:
  a) if follows an initial transitional arrival then (i.e. entry is present in the DB table for transitional arrival for the stop)
    i) mark the departure, keep the "recorded" flag as false,
    ii) delete the 'transitional arrival' entry from the DB table. So that no further processing is required by the scheduled job.
  b) if proceeding a true arrival then:
    i) if initial tentative departure (i.e. outside the fence but inside the transition region)
      (1) if the departure event is new then
        (a) mark the "departureTime"
        (b) Create an tentative departure entry in the DB table for the scheduled job to delete after expiration time.
      (2) if the departure event is following a previously initial tentative departure (i.e. entry is present in the DB table for tentative departure for the stop)
        (a) if this event is past the expiration time of the previous tentative "departureTime", then
          1. delete the tentative departure entry from the DB table,
          2. set the "departureTime" with the value of "tentativeDepartureTime" and update the "tentativeDepartureTime" to null.
    ii) if departure is conclusive (i.e. outside the fence and outside the transition region)
      (1) if the departure event is new (i.e. there is no entry in the DB table for tentative departure for this stop), then
        (a) mark the "departureTime"
      (2) if the departure event is following a previously initial tentative departure (i.e. entry is present in the DB table for tentative departure for the stop), then
        (a) set the "departureTime" with the value of "tentativeDepartureTime" and update the "tentativeDepartureTime" to null.
        (b) delete the entry from the table.

Taking Care of User Provided Updates During the Transitional Arrival and Transitional Departure Period In embodiments, user provided updates during the transitional arrival and transitional departure period are handled as follows:
  1. If the user completes the trip, embodiments can immediately do the processing of any pending transitional arrival and departure into conclusive arrival and departure. This is because, once the trip is completed, there are no more geo-coordinate messages coming for this trip. So if there is any pending initial transitional arrival or departure entry in the DB table, then it can be deleted after marking the corresponding arrival or departure as conclusive for the stop of this trip.
  2. If a stop has been marked with true arrival, and the departure that has happened is tentative. Now if the user updates the stop, to mark this event with "recorded" as false, embodiments need to transition the "tentativeDepartureTime" into "departureTime" based on the user input, and can delete the corresponding entry from the DB table.
  3. Similarly, for an initial transitional arrival, if the user tries to update the "recorded" flag as true, then embodiments can immediately delete the corresponding transitional arrival entry from the DB table.

Sensor Gateway

In embodiments where there are a large number of IoT sensors 101, and/or some sensors are used for fleet monitoring as disclosed above, while other sensors are used for other types of functionality, a gateway between the sensors and the cloud (which can arrival and departure filtering 10) is implemented. Examples of other types of functionality for sensors 101 include measurement of temperature, humidity, CO2 levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 11:
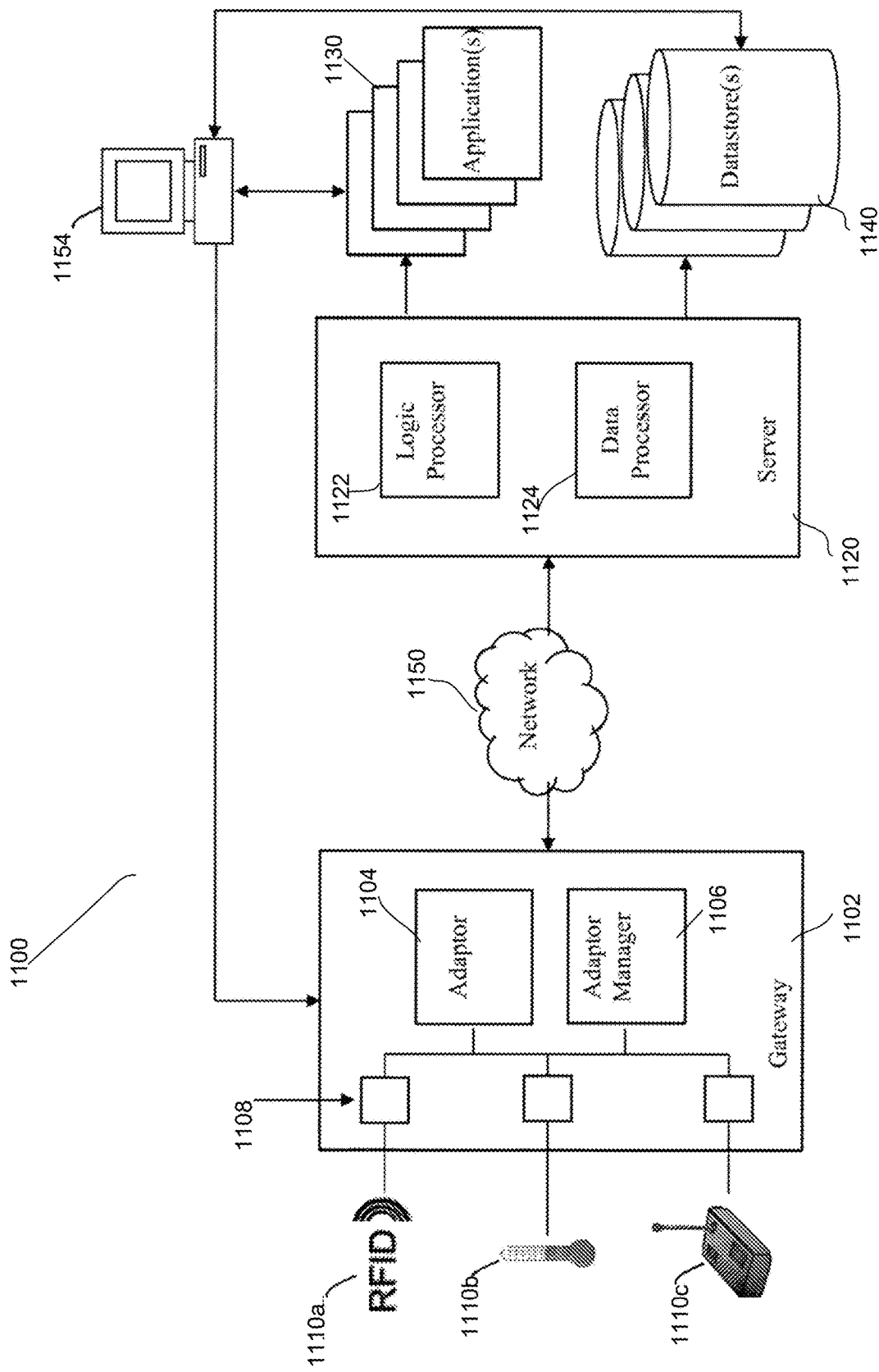
FIG. 11 is a block diagram of a gateway architecture in accordance to embodiments of the invention.

FIG. 11 is a block diagram of a gateway architecture 1100 in accordance to embodiments of the invention. Architecture 1100 permits effective integration between the systems in the operations technology portion and the systems in the information technology portion of the environment. Architecture 1100 generally includes a gateway portion 1102 having front-end data collection logic, and a server portion 1120 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed. Gateway architecture 1100, in general, can function as a sensor message receiving module that receives sensor messages.

Gateway 1102 includes a sensor management module that handles the sensor code (e.g., that is implemented as custom code, such as Java code, specific to each sensor hardware). This module captures the sensor data in a generic way so that any type of data can be used. The gateway locally caches data so it can be pre processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 1102 performs data acquisition and management of local devices 1110a-c. The local devices 1110a-c may include any type of equipment that can be suitably managed by architecture 1100. For example, any number of sensors may be embedded within the local equipment at various sites. Examples of such sensors include RFID sensors at device 1110a, temperature sensors at device 1110b, and other types of smart devices, beacons, and/or machines at device 1110c (including IoT sensors 101).

Local devices 1110a-c can be configured to send data at regular intervals to gateway 1102. Such data may include information to be captured from the local devices. For example, information that may be captured include operating conditions, metrics, pressure, vibration, temperature, and/or flow rate.

In additional to using sensor data for fleet management, as disclosed above, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 1102 includes an adaptor component 1104 and an adaptor manager 1106. Adaptor component 1104 (also referred to herein as an "IoT adaptor") manages the gateway's interaction with local devices 1110a-c, and may include device-specific code components 1108 to perform its processing with local devices 1110a-c. Adapter manager 1106 (also referred to herein as an "IoT adaptor manager") is used to manage the operations, versioning, and/or provisioning of local devices 1110a-c and adaptor component 1104. In some embodiments, gateway 1102 processes incoming data with local analytics (e.g., to analyze operating conditions and to identify fluctuations). To the extent necessary, alerts and data readings can be sent in real-time.

The data collected by gateway 1102 are sent over a network 1150 to server 1120. Server 1120 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 1120, a logic processor 1122 (also referred to herein as an "IoT logic processor") and a data processor 1124 (also referred to herein as an "IoT data processor") are provided to implement analysis and alert processing. These components may include operations technology and industry-specific rules and scripts.

Server 1120 may communicate with one or more applications 1130. Such applications 1130 may include, for example, functionality to implement inventory management, quality management, condition-based maintenance, and/or provide a visualization portal, as well as functionality of FIGS. 8-10 for arrival/departure filtering. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 1120 may also manage the storage of the collected data into one or more datastores 1140. Datastore 1140 includes any combination of hardware and software that allows for ready access to the data that is located at a computer readable storage device. For example, datastore 1140 could be implemented as computer memory operatively managed by an operating system. The data in datastore 1140 could also be implemented as database objects and/or files in a file system.

One or more users may exist at one or more user stations 1154 that interact with the architecture 1100. User station 1154 includes any type of computing station that may be used to operate or interface with architecture 1100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 1100, such as a mouse or keyboard to manipulate a pointing object in a graphical user interface to generate user inputs.

Either server 1120 or the user at user station 1154 may provide control signals to gateway 1102 to control the operation of the gateway 1102 and/or the local devices 1110a-c. The control signals may be used to control any operation necessary at the gateway and/or local device 1110a-c, including for example, to update and provision control software on the gateway and/or to control operation of the local device. Further details of the functionality of architecture 1100, which can be used in conjunction with arrival/departure filtering network/system 150 of FIG. 1, is disclosed in U.S. Pat. No. 10,382,294.

In embodiments, the generated sensor messages are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed, for a planned trip with a planned sequence of stops, embodiments automatically distinguish between the false arrival-departure events from the true arrival-departure events based on a transition region that serves as a location-based filter and a waiting time duration window that serves as a time-based filter.

The transition region is a region surrounding the stop's circular boundary. For arrival, the transition region will distinguish the geo-coordinates that are on and near to the boundary in contrast to the geo-coordinates that are nearer to the stop's geo-coordinate than the stop's boundary. For departure, the transition region will distinguish the geo-coordinates that are on and near to the boundary in contrast to the geo-coordinates that are far away from both the stop's boundary and stop's geo-coordinates. Therefore, the transition region provide with location-based filtering method. Any geo-coordinate that falls inside the transition region will be considered as transition (or tentative) events.

The waiting time duration window is the time taken by the server to decide whether the transition (or tentative) events are true events or false events. A transition event is the initially detected arrival or departure event that has not been determined to be a true event or false event. If within the waiting time duration window, there are no events that are in contrary to the initially detected event, then the initially detected event will be decided as a true event. Vice versa, within this time duration, if there is any event that is in contrary to the initially detected event, then the initially detected event will be decided as a false event. For a transitional arrival event, a departure will be a contrary event. Vice versa, for a transitional departure event, an arrival will be a contrary event. Thus, the waiting time duration window provides with time-based filtering method.

By using both of the filters, embodiments can automatically filter out any false arrival and false departure events from the true arrival and true departure events.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of detecting stops by an entity on a pre-planned trip comprising a plurality of stops and a planned sequence of stops, the sequence of stops defining an order of stops during the pre-planned trip, each stop comprising a geofence boundary comprising a first radius, the method comprising:

for each stop, adding an arrival transition region extending inward from the geofence boundary, the arrival transition region concentric to the corresponding geofence boundary and comprising a second radius that is smaller than the first radius and defined by a band between the second radius and the first radius;

receiving a first geo-location message indicating a first location and corresponding to a first time for the entity;

determining whether the first location falls within a first geofence boundary and within a first arrival transition region corresponding to a first stop having the first geofence boundary;

when the first location falls within the first arrival transition region, waiting for a predefined transitional time period;

during the predefined transitional time period and during the waiting, when a second geo-location message is received indicating a second location inside the first geofence boundary and outside the first arrival transition region, the first time is automatically determined to be an arrival time for the first stop;

after the predefined transitional time period and after the waiting, when no geo-location messages have been received during the transitional time period that fall outside of the first geofence boundary, the first time is automatically determined to be the arrival time for the first stop; and after the predefined transitional time period and after the waiting, when one or more geo-location messages have been received during the transitional time period indicating a third location that falls outside of the first geofence boundary, the first time is automatically determined to not be the arrival time for the first stop.

2. The method of claim 1, further comprising:

for each stop, adding a departure transition region extending outward from the geofence boundary, the departure transition region concentric to the corresponding geofence boundary and comprising a third radius that is larger than the first radius and defined by a band between the first radius and the third radius;

receiving a fourth geo-location message indicating a fourth location and corresponding to a fourth time for the entity;

determining whether the fourth location falls outside of the first geofence boundary and within a first departure transition region corresponding to the first stop having the first geofence boundary;

when the fourth location falls within the first departure transition region, waiting for the predefined transitional time period;

during the predefined transitional time period and during the waiting, when a fifth geo-location message is received indicating a fifth location outside the first geofence boundary and outside the first departure transition region, the fourth time is determined to be a departure time for the first stop;

after the predefined transitional time period and after the waiting, when no geo-location messages have been received during the transitional time period that fall outside of the first geofence boundary, the fourth time is determined to be the departure time for the first stop; and after the predefined transitional time period and after the waiting, when one or more geo-location messages have been received during the transitional time period indicating a fifth location that falls inside of the first geofence boundary, the fourth time is determined to not be the departure time for the first stop.

3. The method of claim 1, wherein the plurality of stops comprise a first stop and a subsequent second stop that are repeated stops, further comprising:

generating a first arrival event and a first departure event for the first stop;

before an elapse of a predefined separation time initiated in response to the first departure event, all subsequent arrival and departure events at the first stop correspond to the first stop; and after the elapse of the predefined separation time initiated in response to the first departure event, all subsequent arrival and departure events at the first stop correspond to the second stop.

4. The method of claim 3, further comprising:

after a second arrival event at a third stop that is not a repeated stop of the first stop and the second stop, all subsequent arrival and departure events at the first stop correspond to the second stop.

5. The method of claim 1, wherein the entity is associated with an Internet of Things (IoT) device that provides the first geo-location message, and wherein the first geo-location message is received via a gateway sensor that is configured to communicate with a plurality of IoT devices having different protocols and convert the different protocols to a standard protocol.

6. The method of claim 1, wherein the entity comprises a vehicle and the pre-planned trip comprises a trip plan comprising, for the vehicle, a start location, an end location, and the plurality of stops in the planned sequence.

7. The method of claim 1, wherein a radius of the first arrival transition region (Ra) equals (radius of the first geofence boundary)×(j), where j comprises a decimal number such that $0.1 <= j < 1$.

8. The method of claim 1, wherein the predefined transitional time period (Tw) equals (planned stop duration for the first stop)×(k), where k is a fractional number such that $0.25 <= k < 0.5$.

9. A non-transitory computer-readable medium having instructions stored thereon that, when executed by one or more processors, cause the processors to detect stops by an entity on a pre-planned trip comprising a plurality of stops and a planned sequence of stops, the sequence of stops defining an order of stops during the pre-planned trip, each stop comprising a geofence boundary comprising a first radius, the detecting comprising:

for each stop, adding an arrival transition region extending inward from the geofence boundary, the arrival transition region concentric to the corresponding geofence boundary and comprising a second radius that is smaller than the first radius and defined by a band between the second radius and the first radius;

receiving a first geo-location message indicating a first location and corresponding to a first time for the entity;

determining whether the first location falls within a first geofence boundary and within a first arrival transition region corresponding to a first stop having the first geofence boundary;

when the first location falls within the first arrival transition region, waiting for a predefined transitional time period;

during the predefined transitional time period and during the waiting, when a second geo-location message is received indicating a second location inside the first geofence boundary and outside the first arrival transition region, the first time is automatically determined to be an arrival time for the first stop;

after the predefined transitional time period and after the waiting, when no geo-location messages have been received during the transitional time period that fall outside of the first geofence boundary, the first time is automatically determined to be the arrival time for the first stop; and after the predefined transitional time period and after the waiting, when one or more geo-location messages have been received during the transitional time period indicating a third location that falls outside of the first geofence boundary, the first time is automatically determined to not be the arrival time for the first stop.

10. The computer-readable medium of claim 9, the detecting further comprising:

for each stop, adding a departure transition region extending outward from the geofence boundary, the departure transition region concentric to the corresponding geofence boundary and comprising a third radius that is larger than the first radius and defined by a band between the first radius and the third radius;

receiving a fourth geo-location message indicating a fourth location and corresponding to a fourth time for the entity;

determining whether the fourth location falls outside of the first geofence boundary and within a first departure transition region corresponding to the first stop having the first geofence boundary;

when the fourth location falls within the first departure transition region, waiting for the predefined transitional time period;

during the predefined transitional time period and during the waiting, when a fifth geo-location message is received indicating a fifth location outside the first geofence boundary and outside the first departure transition region, the fourth time is determined to be a departure time for the first stop;

after the predefined transitional time period and after the waiting, when no geo-location messages have been received during the transitional time period that fall outside of the first geofence boundary, the fourth time is determined to be the departure time for the first stop; and after the predefined transitional time period and after the waiting, when one or more geo-location messages have been received during the transitional time period indicating a fifth location that falls inside of the first geofence boundary, the fourth time is determined to not be the departure time for the first stop.

11. The computer-readable medium of claim 9, wherein the plurality of stops comprise a first stop and a subsequent second stop that are repeated stops, further comprising:

generating a first arrival event and a first departure event for the first stop;

before an elapse of a predefined separation time initiated in response to the first departure event, all subsequent arrival and departure events at the first stop correspond to the first stop; and after the elapse of the predefined separation time initiated in response to the first departure event, all subsequent arrival and departure events at the first stop correspond to the second stop.

12. The computer-readable medium of claim 11, the detecting further comprising:

after a second arrival event at a third stop that is not a repeated stop of the first stop and the second stop, all subsequent arrival and departure events at the first stop correspond to the second stop.

13. The computer-readable medium of claim 9, wherein the entity is associated with an Internet of Things (IoT) device that provides the first geo-location message, and wherein the first geo-location message is received via a gateway sensor that is configured to communicate with a plurality of IoT devices having different protocols and converting the different protocols to a standard protocol.

14. The computer-readable medium of claim 9, wherein the entity comprises a vehicle and the pre-planned trip comprises a trip plan comprising, for the vehicle, a start location, an end location, and the plurality of stops in the planned sequence.

15. The computer-readable medium of claim 9, wherein a radius of the first arrival transition region ($R_a$) equals (radius of the first geofence boundary)×(j), where j comprises a decimal number such that $0.1 <= j < 1$.

16. The computer-readable medium of claim 9, wherein the predefined transitional time period ($T_w$) equals (planned stop duration for the first stop)×(k), where k is a fractional number such that $0.25 <= k < 0.5$.

17. A fleet monitoring system for detecting stops by an entity on a pre-planned trip comprising a plurality of stops and a planned sequence of stops, the sequence of stops defining an order of stops during the pre-planned trip, each stop comprising a geofence boundary comprising a first radius, the system comprising:

a sensor message receiving module;

one or more processors that execute instructions to, in response to receiving sensor messages from the sensor message receiving module:

for each stop, add an arrival transition region extending inward from the geofence boundary, the arrival transition region concentric to the corresponding geofence boundary and comprising a second radius that is smaller than the first radius and defined by a band between the second radius and the first radius;

receive a first geo-location message indicating a first location and corresponding to a first time for the entity;

determine whether the first location falls within a first geofence boundary and within a first arrival transition region corresponding to a first stop having the first geofence boundary;

when the first location falls within the first arrival transition region, wait for a predefined transitional time period;

during the predefined transitional time period and during the waiting, when a second geo-location message is received indicating a second location inside the first geofence boundary and outside the first arrival transition region, the first time is automatically determined to be an arrival time for the first stop;

after the predefined transitional time period and after the waiting, when no geo-location messages have been received during the transitional time period that fall outside of the first geofence boundary, the first time is automatically determined to be the arrival time for the first stop; and after the predefined transitional time period and after the waiting, when one or more geo-location messages have been received during the transitional time period indicating a third location that falls outside of the first geofence boundary, the first time is automatically determined to not be the arrival time for the first stop.

18. The fleet monitoring system of claim 17, the processors further comprising:

for each stop, add a departure transition region extending outward from the geofence boundary, the departure transition region concentric to the corresponding geofence boundary and comprising a third radius that is larger than the first radius and defined by a band between the first radius and the third radius;

receive a fourth geo-location message indicating a fourth location and corresponding to a fourth time for the entity;

determine whether the fourth location falls outside of the first geofence boundary and within a first departure transition region corresponding to the first stop having the first geofence boundary;

when the fourth location falls within the first departure transition region, wait for the predefined transitional time period;

during the predefined transitional time period and during the waiting, when a fifth geo-location message is received indicating a fifth location outside the first geofence boundary and outside the first departure transition region, the fourth time is determined to be a departure time for the first stop;

after the predefined transitional time period and after the waiting, when no geo-location messages have been received during the transitional time period that fall outside of the first geofence boundary, the fourth time is determined to be the departure time for the first stop; and after the predefined transitional time period and after the waiting, when one or more geo-location messages have been received during the transitional time period indicating a fifth location that falls inside of the first geofence boundary, the fourth time is determined to not be the departure time for the first stop.

19. The fleet monitoring system of claim 17, wherein the plurality of stops comprise a first stop and a subsequent second stop that are repeated stops, the processors further comprising:

generate a first arrival event and a first departure event for the first stop;

before an elapse of a predefined separation time initiated in response to the first departure event, all subsequent arrival and departure events at the first stop correspond to the first stop; and after the elapse of the predefined separation time initiated in response to the first departure event, all subsequent arrival and departure events at the first stop correspond to the second stop.

20. The fleet monitoring system of claim 19, the processors further comprising:

after a second arrival event at a third stop that is not a repeated stop of the first stop and the second stop, all subsequent arrival and departure events at the first stop correspond to the second stop.

\* \* \* \* \*